(12) United States Patent
Zacharenko

(10) Patent No.: US 10,473,482 B2
(45) Date of Patent: Nov. 12, 2019

(54) TEMPLATE-BASED WEATHER DATA QUERIES FOR COMPILING LOCATION-BASED WEATHER MONITORING DATA FOR DEFINED TRANSPORTATION ROUTES

(71) Applicant: United Parcel Service of America, Inc., Atlanta, GA (US)

(72) Inventor: Dimitri Zacharenko, Mandeville, LA (US)

(73) Assignee: United Parcel Service of America, Inc., Atlanta, GA (US)

(*) Notice: Subject to any disclaimer, the term of this patent is extended or adjusted under 35 U.S.C. 154(b) by 0 days.

(21) Appl. No.: 15/386,832

(22) Filed: Dec. 21, 2016

(65) Prior Publication Data

US 2017/0276507 A1    Sep. 28, 2017

Related U.S. Application Data

(60) Provisional application No. 62/313,201, filed on Mar. 25, 2016.

(51) Int. Cl.
*G01C 21/36* (2006.01)
*G06F 16/904* (2019.01)
(Continued)

(52) U.S. Cl.
CPC ........ *G01C 21/3694* (2013.01); *G01W 1/06* (2013.01); *G06F 16/904* (2019.01);
(Continued)

(58) Field of Classification Search
CPC .................. G01C 21/3691; G01C 21/3694
See application file for complete search history.

(56) References Cited

U.S. PATENT DOCUMENTS

| 8,416,067 B2 | 4/2013 | Davidson et al. |
| 8,983,762 B2 | 3/2015 | Davidson |

(Continued)

OTHER PUBLICATIONS

International Searching Authority, International Search Report and Written Opinion for International Application No. PCT/US2017/016885, dated Apr. 28, 2017, 14 pages, European Patent Office, Netherlands.

*Primary Examiner* — Yi Yang
(74) *Attorney, Agent, or Firm* — Shook, Hardy & Bacon

(57) ABSTRACT

Various embodiments are directed to systems and methods for monitoring and compiling weather information/data for a plurality of identified locations along a route. A central computing entity 100 may store and retrieve a weather information/data inquiry template from memory, and may populate the weather information/data inquiry template with relevant information/data identifying locations for which weather information/data is requested. The central computing entity 100 may utilize the populated inquiry template to retrieve weather information/data from one or more weather information/data sources by transmitting the populated weather information/data inquiry to the one or more weather information/data sources to cause the weather information/data sources to provide weather information/data to the one or more computer processors; and to compile the retrieved weather information/data from the one or more weather information/data sources.

20 Claims, 8 Drawing Sheets

(51) Int. Cl.
  *G01W 1/06*  (2006.01)
  *G06Q 10/08*  (2012.01)
  *G06T 11/20*  (2006.01)
  *G06Q 50/28*  (2012.01)
  *G06F 3/0484*  (2013.01)

(52) U.S. Cl.
  CPC ......... *G06Q 10/0832* (2013.01); *G06Q 50/28* (2013.01); *G06T 11/206* (2013.01); *G06F 3/04842* (2013.01); *G06T 2210/64* (2013.01)

(56) References Cited

U.S. PATENT DOCUMENTS

| | | |
|---|---|---|
| 8,996,287 B2 | 3/2015 | Davidson et al. |
| 9,134,426 B1 | 9/2015 | Siris |
| 2013/0024333 A1* | 1/2013 | Jones, Jr. ............... G06Q 10/10 705/30 |
| 2014/0277939 A1* | 9/2014 | Ren ................... G01C 21/3638 701/36 |
| 2014/0358970 A1* | 12/2014 | Morris .............. G06F 17/30392 707/772 |
| 2014/0368361 A1* | 12/2014 | Leblanc ........... G08G 1/096811 340/995.12 |
| 2015/0142691 A1 | 5/2015 | Gillen et al. |
| 2015/0269521 A1* | 9/2015 | Knapp ............. G06Q 10/08355 705/338 |
| 2016/0042317 A1 | 2/2016 | Goodman et al. |

* cited by examiner

TEMPLATE-BASED WEATHER DATA QUERIES FOR COMPILING LOCATION-BASED WEATHER MONITORING DATA FOR DEFINED TRANSPORTATION ROUTES

CROSS-REFERENCE TO RELATED APPLICATIONS

This patent application claims priority to U.S. Provisional Application Ser. No. 62/313,201 filed Mar. 25, 2016, which is incorporated herein by reference in its entirety.

BACKGROUND

Particularly for environment-sensitive items (e.g., temperature sensitive items) being transported between an origin and a destination, shippers, carriers, and/or recipients may desire to ensure that an item does not undesirably reach high and/or low temperatures during shipment. However, due to possible temperature fluctuations that may occur as a carrier transports items through various regions between an origin and a destination, parties have historically faced a great deal of uncertainty in estimating whether a particular item is likely to be exposed to undesirably high and/or undesirably low temperatures during transportation. Accordingly, because parties may be unsure whether an item is likely to be exposed to undesirable environmental conditions, such as undesirable temperatures during shipment, parties may utilize known methodologies for maintaining the temperature of an item during shipment, regardless of the environmental temperature in a region surrounding the item. In certain instances, such additional precaution may be unnecessary when an item is routed through regions in which environmental temperatures are estimated to remain within an acceptable temperature range for the item. Such precautionary methodologies often require costly equipment and/or additional resources in order to ensure that an item temperature remains within a desired range, and accordingly utilizing such precautionary methodologies may expose parties to unnecessary cost when a transportation route does not expose the item to undesirable temperatures.

Accordingly, a need exists for concepts for monitoring environmental conditions along transportation routes to determine whether an item is likely to be exposed to undesirable environmental conditions.

BRIEF SUMMARY

Various embodiments are directed to a route-based weather monitoring system for compiling weather information/data relevant for a plurality of locations along a route in real-time. In various embodiments, the weather monitoring system comprises a memory and one or more computer processors. In various embodiments, the one or more computer processors are collectively configured to: receive route information/data identifying a plurality of locations along a route; responsive to receiving the route data, retrieve an inquiry template in real-time from the memory; populate, based at least in part on the route data, the inquiry template to generate a weather information/data inquiry to request weather information/data relating to the plurality of locations along the route; retrieve, from one or more weather information/data sources, weather information/data for each of the plurality of locations by transmitting the weather information/data inquiry to the one or more weather information/data sources to cause the one or more weather information/data sources to provide weather information/data to the one or more computer processors; and compile the weather information/data retrieved from the one or more weather information/data sources; and generate, via a display, an interactive graphical display incorporating at least a portion of the weather information/data relating to each of the one or more locations.

In certain embodiments, the route-based weather monitoring system further comprises a distributed network of weather information/data sources each located at an associated physical location and each configured to generate weather information/data for the associated physical location. In such embodiments, each of the plurality of locations along the route may be selected from physical locations having an associated weather information/data source; and retrieving the weather information/data may comprise transmitting at least a portion of the weather information/data inquiry to a plurality of weather information/data sources each associated with a location along the route.

Certain embodiments are directed to a method for compiling weather information/data relevant for a plurality of locations along a route. In various embodiments, the method comprises: receiving route information/data identifying a plurality of locations along a route; responsive to receiving the route data, retrieving an inquiry template in real-time from a memory; populating, based at least in part on the route data, the inquiry template to generate a weather information/data inquiry to request weather information/data relating to the plurality of locations along the route; retrieving, from one or more weather information/data sources, weather information/data for each of the plurality of locations by transmitting the weather information/data inquiry to the one or more weather information/data sources to cause the one or more weather information/data sources to provide weather information/data to the one or more computer processors; compiling, via the one or more computer processors, the weather information/data retrieved from the one or more weather information/data sources; and generating, via the one or more processors and a display, an interactive graphical display incorporating at least a portion of the weather information/data relating to each of the one or more locations.

Moreover, certain embodiments are directed to a computer-program product comprising at least one non-transitory computer-readable storage medium having computer-readable program code portions stored therein. In various embodiments, the computer-readable program code portions comprises: an executable portion configured to receive route information/data identifying a plurality of locations along a route; an executable portion configured to, responsive to receiving the route data, retrieve an inquiry template in real-time from the memory; an executable portion configured to populate, based at least in part on the route data, the inquiry template to generate a weather information/data inquiry to request weather information/data relating to the plurality of locations along the route; an executable portion configured to retrieve, from one or more weather information/data sources, weather information/data for each of the plurality of locations by transmitting the weather information/data inquiry to the one or more weather information/data sources to cause the one or more weather information/data sources to provide weather information/data to the one or more computer processors; and an executable portion configured to compile, via the one or more computer processors, the weather information/data retrieved from the one or more weather information/data sources; and an executable portion configured to generate, via the one or more processors and a display, an interactive graphical display incorporating at least a portion of the weather information/data relating to each of the one or more locations.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
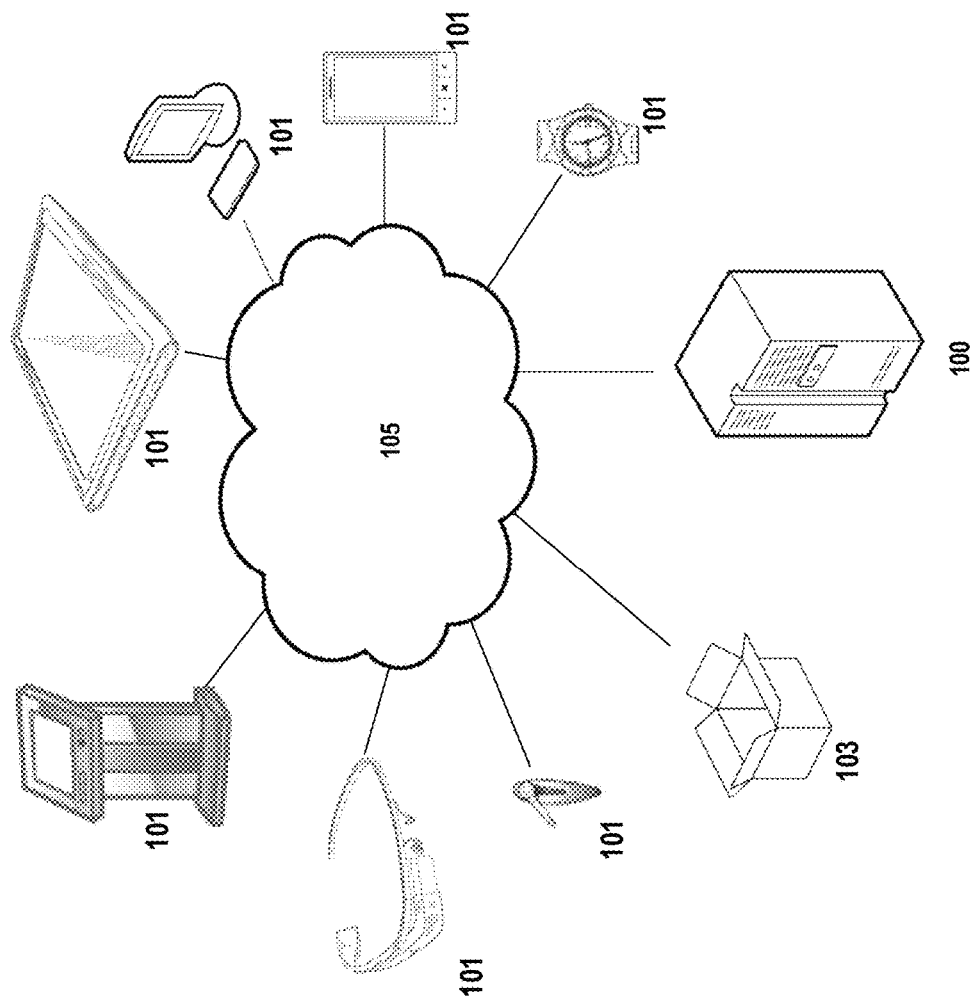
FIG. 1 is a diagram of a system that can be used to practice various embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments solve the computer problem of automatically identifying weather information/data for specific locations along a predefined route in real-time by automatically building a weather information/data inquiry based on information/data indicative of the predefined route to retrieve relevant weather information/data from a weather information/data source. Accordingly, to provide simultaneous analysis of weather information/data at various locations along the predefined route, various embodiments retrieve weather information/data from a weather information/data source and compile a comprehensive weather information/data report for the route, including weather information/data for each of a plurality of locations along the route. Such embodiments thereby overcome existing technological limitations for analyzing weather information/data along a route extending across a plurality of locations that may have differing weather conditions.

Various embodiments are directed to systems and methods for monitoring temperatures along a predefined route. As discussed herein, systems may be configured to receive information/data indicative of one or more locations along a predefined route, including, for example, an origin, a destination, and/or one or more waypoints along the predefined route. Moreover, in various embodiments the system is additionally configured to receive information/data indicative of one or more temperature thresholds, such as a maximum allowable temperature and/or a minimum allowable temperature. The system may be configured to obtain temperature information/data for each of the received locations along the predefined route, and to compare the temperature information/data against the maximum and/or minimum allowable temperatures to determine whether the predefined route traverses regions in which a corresponding temperature transcends a maximum and/or minimum allowable temperature.

In various embodiments, the temperature information/data may be historical information/data (e.g., historical summary data, such as average temperature information/data for a region), forecast information/data (e.g., forecast temperatures for a region), and/or archive information/data (e.g., actual historical temperatures detected in a region at specific times). Accordingly, the system may be configured to determine whether the planned route is likely to traverse an area in which the temperature transcends a temperature threshold, whether a predefined (and executed) route traversed an area in which the temperature did transcend a temperature threshold, and/or whether a planned route traverses an area in which a temperature historically transcends a temperature threshold during a particular time period.

In various embodiments, the system may additionally be configured to determine optimal travel times (e.g., time periods, dates, and/or the like) based on the temperature data.

Moreover, in various embodiments the system may be configured to generate one or more user interfaces providing a comparison between one or more received temperature thresholds and the determined temperature data.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more shipments/items 103, one or more user computing entities 101, one or more containers 107, one or more central computing entities 100, one or more Global Positioning System (GPS) satellites 115, one or more location sensors 120, one or more telematics sensors 125, one or more information/data collection devices 130, one or more networks 105, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

1. Exemplary Carrier Computing Entities

Figure 2:
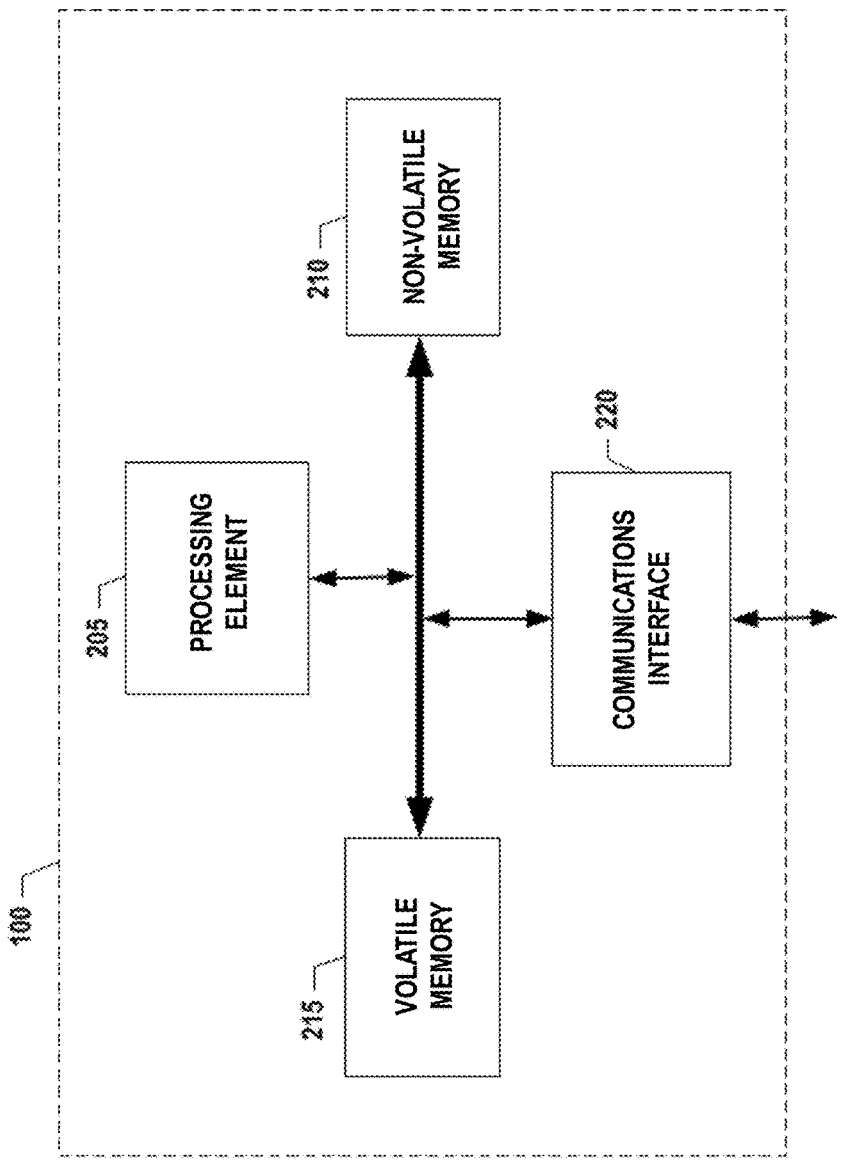
FIG. 2 is a schematic of a central computing entity 100 in accordance with certain embodiments of the present invention.

FIG. 2 provides a schematic of a central computing entity 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the central computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the central computing entity 100 may include or be in communication with one or more processing elements 205 (also referred to as processors, processing circuitry, and/or similar terms used herein interchangeably) that communicate with other elements within the central computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the central computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., item/shipment database 40), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In one embodiment, the central computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the central computing entity 100 with the assistance of the processing element 205 and operating system.

As indicated, in one embodiment, the central computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the central computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the central computing entity 100 may include or be in communication with one or more input elements, such as a keyboard input, a mouse input, a touch screen/display input, motion input, movement input, audio input, pointing device input, joystick input, keypad input, and/or the like. The central computing entity 100 may also include or be in communication with one or more output elements (not shown), such as audio output, video output, screen/display output, motion output, movement output, and/or the like.

In one embodiment, the central computing entity 100 may include various payment features and functionalities. Payments (received or paid) may be in a variety of forms, such as via debit cards, credit cards, direct credits, direct debits, cash, check, money order, Internet banking, e-commerce payment networks/systems (e.g., PayPal™ Google Wallet, Amazon Payments), virtual currencies (e.g., Bitcoins), award or reward points, and/or the like. Such payments may be made using a variety of techniques and approaches, including through NFC technologies such as PayPass, Android Beam, BlueTooth low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like.

As will be appreciated, one or more of the central computing entity's 100 components may be located remotely from other central computing entity 100 components, such as in a distributed system. Furthermore, one or more of the components may be combined and additional components performing functions described herein may be included in the central computing entity 100. Thus, the central computing entity 100 can be adapted to accommodate a variety of needs and circumstances. As will be recognized, these architectures and descriptions are provided for exemplary purposes only and are not limiting to the various embodiments.

2. Exemplary User Computing Entities

Figure 3:
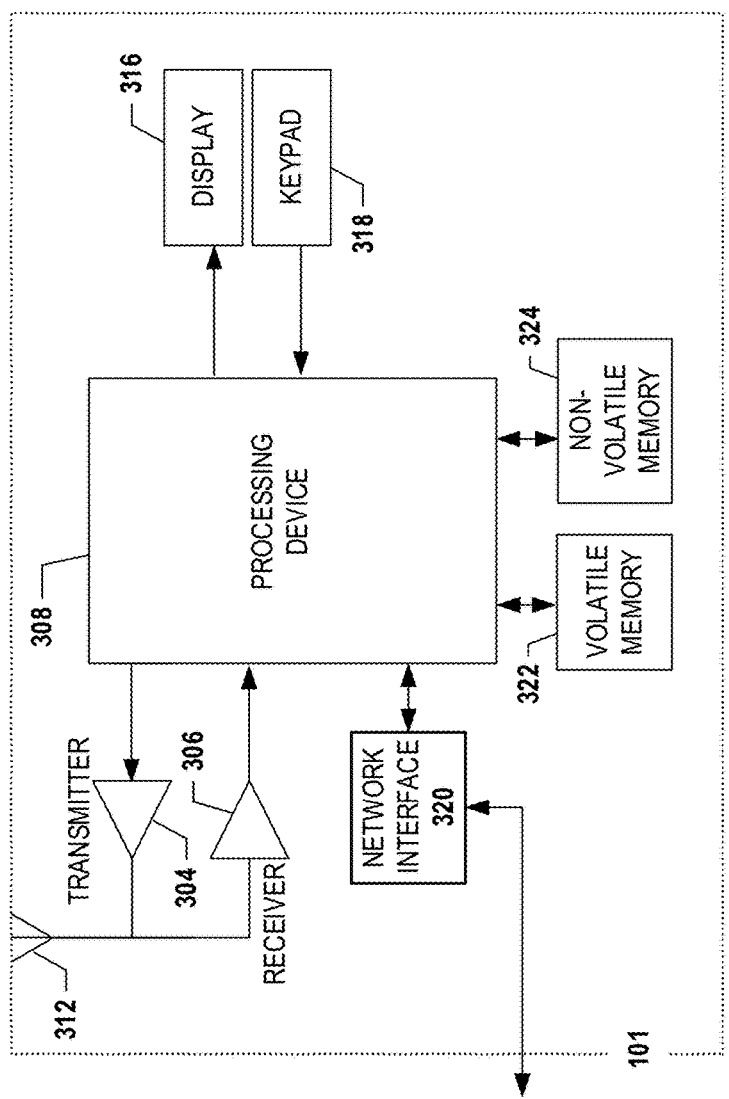
FIG. 3 is a schematic of a mobile computing entity in accordance with certain embodiments of the present invention.

A user may be an individual, a family, a company, an organization, an entity, a department within an organization, a representative of an organization and/or person, and/or the like—whether or not associated with a carrier. To do so, a user may operate a user computing entity 101 that may include one or more components that are functionally similar to those of the central computing entity 100. FIG. 3 provides an illustrative schematic representative of a user computing entity 101 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 101 can be operated by various parties, including carrier personnel (sorters, loaders, delivery drivers, network administrators, and/or the like). As shown in FIG. 3, the user computing entity 101 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 101 may be capable of operating with one or more air interface standards, communication protocols, modulation types, and access types. More particularly, the user computing entity 101 may operate in accordance with any of a number of wireless communication standards and protocols, such as those described above with regard to the central computing entity 100. In a particular embodiment, the user computing entity 101 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 101 may operate in accordance with multiple wired communication standards and protocols, such as those described above with regard to the central computing entity 100 via a network interface 320.

Via these communication standards and protocols, the user computing entity 101 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 101 can also download changes, add-ons, and updates, for instance, to its firmware, software (e.g., including executable instructions, applications, program modules), and operating system.

According to one embodiment, the user computing entity 101 may include location determining aspects, devices, modules, functionalities, and/or similar words used herein interchangeably. For example, the user computing entity 101 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Global Navigation Satellite systems (GLONASS), Department of Defense (DOD) satellite systems, the European Union Galileo positioning systems, the Chinese Compass navigation systems, Indian Regional Navigational satellite systems, and/or the like. Furthermore, the one or more location determining aspects may be compatible with Assisted GPS (A-GPS) for quick time to first fix and jump starting the ability of the location sensors to acquire location almanac and ephemeris data, and/or be compatible with Satellite Based Augmentation System (SBAS) such as Wide Area Augmentation System (WAAS), European Geostationary Navigation Overlay Service (EGNOS), and/or MTSAT Satellite Augmentation System (MSAS), GPS Aided GEO Augmented Navigation (GAGAN) to increase GPS accuracy. The information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 101 position in connection with a variety of other systems, including cellular towers, Wi-Fi access points, and/or the like. Similarly, the user computing entity 101 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 101 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 101 to interact with and/or cause display of information/data from the central computing entity 100, as described herein. The user input interface can comprise any of a number of devices or interfaces allowing the user computing entity 101 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 101 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 101 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 101. As indicated, this may include a user application that is resident on the entity or accessible through a browser or other user interface for communicating with the central computing entity 100 and/or various other computing entities.

In another embodiment, the user computing entity 101 may include one or more components or functionality that are the same or similar to those of the central computing entity 100, as described in greater detail above. As will be recognized, these architectures and descriptions are provided for exemplary purposes only and are not limiting to the various embodiments.

3. Exemplary Shipments/Items

In one embodiment, a container may be configured to store and transport one or more shipments/items 103 (e.g., shipments, packages, pallets, etc.) of varying shapes and sizes and be stored upon or in one or more vehicles. For instance, in various embodiments, a container may be a unit load device (ULD) used to store and transport shipments/items 103 on tractor/trailer combinations or an aircraft. A shipment/item 103 may be any tangible and/or physical object. In one embodiment, a shipment/item 103 may be or be enclosed in one or more packages, envelopes, parcels, bags, goods, products, loads, crates, items banded together, drums, the like, and/or similar words used herein interchangeably.

In one embodiment, each container and/or shipment/item 103 may include and/or be associated with a unique tracking identifier, such as an alphanumeric identifier or machine readable identifier. Such tracking identifiers may be represented as text, barcodes, tags, character strings, Aztec Codes, MaxiCodes, information/data Matrices, QR Codes, electronic representations, and/or the like. A unique tracking identifier (e.g., 1Z5600100300083767) may be used by a carrier to identify and track containers and shipments/items 103 as they move through a carrier's transportation network. For example, information/data comprising a tracking identifier can be read, scanned, transmitted, advertised, and/or the like to provide and/or identify/determine the location of a container and/or shipment/item 103. As will be recognized, shipments/items 103 can be associated with a container and therefore associated shipments/items 103 can be considered to be located in the container at the determined location of the container. These can be referred to as "logical" scans/determinations or "virtual" scans/determinations.

Such tracking identifiers can be affixed to shipments/items 103 by, for example, using a sticker (e.g., label) with the unique tracking identifier printed thereon (in human and/or machine readable form). In other embodiments, a container/item beacon/tag/sensor or an RFID/BLE beacon/tag/sensor may be affixed to or associated with each container and/or shipment/item 103 and store a unique tracking identifier 103. In various embodiments, a beacon/tag/sensor may be a BLE tag, a beacon (e.g., a URIBeacon, an AltBeacon, or an iBeacon), an RFID beacon/tag/sensor, a BLE beacon/tag/sensor, an NFC device, a Wi-Fi device, and/or the like. The container/item beacon can include some or all of the following components: one or more input interfaces for receiving information/data, one or more output interfaces for transmitting information/data, a processor, a clock, memory modules, one or more sensors for sensing and detecting various information/data, and a power source. The power source may be an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each container/item beacon can store one or more unique identifiers, such as a tracking identifier for the corresponding shipment/item 103. The unique identifier may identify the associated container (and/or shipment/item 103) and/or the container/item beacon. Via various communication standards and protocols, the container/item beacon associated with the container and/or shipment/item 103 can be communicated with, interrogated, read, and/or the like.

4. Exemplary Weather Station

In various embodiments, a weather station may be configured to collect/monitor/determine weather information/data for a specific location in which the weather station is located. Weather stations may be located at various physical locations, such as at carrier locations (e.g., sort location), along known travel routes (e.g., along highways), and/or the like. In various embodiments, the weather stations may form a part of a distributed network of weather stations each located at respective physical locations and each configured to generate and/or store weather information/data for the associated physical location. The distributed weather stations provide real-time weather information/data.

Weather stations may comprise thermometers, barometers, humidity sensors, wind speed sensors, ultraviolet (UV) sensors, and/or the like. In various embodiments, weather stations may comprise one or more computing components, such as those described above in reference to central computing entities and/or user computing entities 101. For example, weather stations may comprise one or more processing entities, one or more non-transitory memory storage areas, and/or one or more communication interfaces (e.g., wireless communication interfaces and/or wired communication interfaces). In various embodiments, one or more weather stations may be associated with a weather station identifier (e.g., a unique character string, location coordinates, and/or the like) that may be utilized to distinguish between various weather stations. For example, a weather station may be associated with a weather station identifier indicative of the location of the weather station. As a specific example, a weather station may be indicative of a carrier location at which the weather station is placed, such as a south Atlanta, Ga. sort location weather station. As yet another example, weather stations may be associated with a unique alphanumeric character string, such as WS102744. In various embodiments, the unique weather station identifier may be utilized to identify the location of the weather station (e.g., by the central computing entity 100).

Weather stations may be configured to generate weather information/data indicative of current weather conditions at the weather station. The weather stations may be configured to store weather information/data locally (e.g., via onboard memory storage devices) and/or the weather station may be configured to transmit weather information/data to one or more other computing entities (e.g., central computing entity 100). In various embodiments, information/data transmissions from a weather station to another computing entity may comprise the transmitted information/data (e.g., weather data) and may comprise information/data indicative of the identity of the transmitting weather station. As will be discussed herein, generated weather information/data may be stored in a weather archive, for example, at the weather station and/or at another computing entity (e.g., central computing entity 100). In various embodiments, the archived weather information/data may comprise actual collected weather information/data stored in association with time information/data indicative of the time at which the archived weather information/data was generated by the weather station. As a specific, non-limiting example, a stored archived information/data record may comprise information/data indicating that the weather at a particular weather station was 25 degrees Celsius, 65% humidity, with a barometric pressure of 30.24 mm Hg on Oct. 21, 2015 at 3:32:04 PM.

In various embodiments, the weather stations may generate and/or receive forecast weather data. The forecast weather information/data may be indicative of predicted future weather at the location of the weather station. In various embodiments, the forecast weather information/data may predict weather for a predefined period of time into the future (e.g., 4 days, 1 week, and/or the like). The forecast weather information/data may be stored locally at the weather station, and/or may be stored remotely at a separate computing entity (e.g., central computing entity 100) in association with information/data identifying the corresponding weather station.

III. Exemplary System Operation

Figure 4:
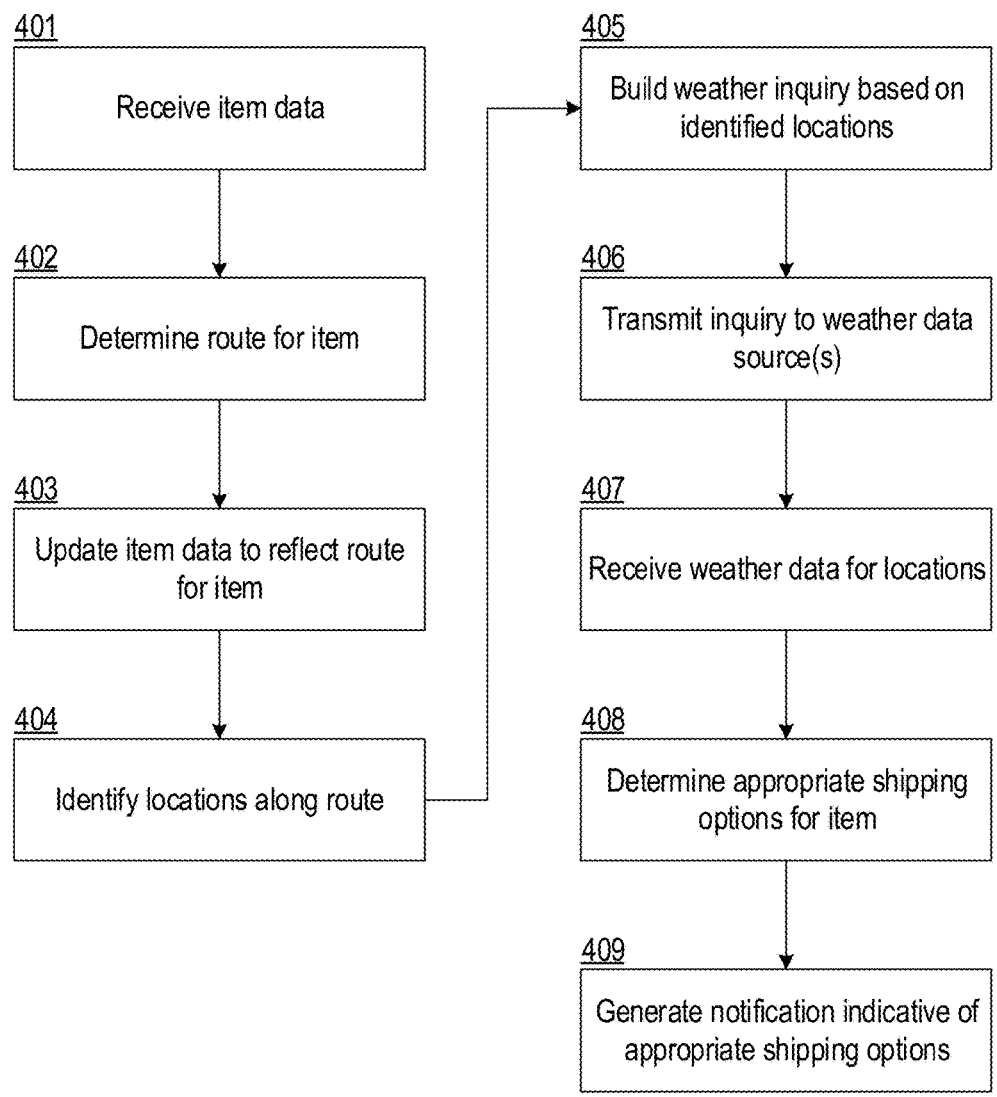
FIG. 4 is a flow chart showing an example method for retrieving weather information/data for a plurality of locations according to aspects of the present invention.

Reference will now be made to FIGS. 4-8. FIG. 4 is a flowchart illustrating operations and processes that can be used in accordance with various embodiments of providing weather information/data along a predefined route. FIGS. 5-8 are example screenshots illustrating compiled weather information/data for a predefined route.

1. Container/Item Information/Data

In one embodiment, the process may begin by the central computing entity 100 (or other appropriate computing entity) generating and/or receiving item information/data for one or more shipments/items 103. For example, a customer may initiate the shipping process by providing information/data to the central computing entity 100. In various embodiments, the customer (e.g., a customer or customer representative operating a customer computing entity) may access a webpage, application, dashboard, browser, or portal of a carrier. After the customer is identified (e.g., based on his or her profile), the customer may initiate shipment of a shipment/item 103. In various embodiments, the central computing entity 100 may provide a user interface (e.g., browser, dashboard, application) for the customer to provide item information/data which includes certain details regarding the shipment/item 103. In various embodiments, the item information/data may include a name, street address, city, state, postal code, country, telephone number, and/or the like for the consignor and/or the consignee. In various embodiments, the user interface may comprise a fillable form with fields including ship-from information/data and ship-to information/data. In various embodiments, some of the information/data fields may be pre-populated. For example, if the customer logged into a registered account/profile, the address information/data entered during registration may be pre-populated in certain information/data fields. In some embodiments, the customer may also have a digital address book associated with the account comprising address information/data for possible ship-to and/or ship-from information/data (see FIGS. 4, 5, and 6). The customer may be able to select certain ship-to and/or ship-from information/data from the address book for the associated shipment/item 103.

In one embodiment, after the central computing entity 100 receives the ship-to and/or ship-from information/data from the customer, the central computing entity 100 may perform one or more validation operations. For example, the central computing entity 100 may determine whether the primary address (and/or other addresses) in the specified country or postal code is eligible for a pick-up or delivery. The central computing entity 100 may also determine whether the primary address (and/or other secondary addresses) is valid, e.g., by passing the primary address through one or more address cleansing or standardization systems. The central computing entity 100 may perform a variety of fraud prevention measures as well, such as determining whether the customers (or one of the delivery addresses) have been "blacklisted" from pick-up and/or delivery services. As will be recognized, a variety of other approaches and techniques can be used to adapt to various needs and circumstances.

In addition to ship-to and/or ship-from information/data, the item information/data may also include service level information/data. The service level options may be, for example, Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like.

In one embodiment, the central computing entity 100 may receive or determine item characteristics/attributes and store the characteristics/attributes in the item information/data. The characteristics/attributes may include the dimensions, weight, shipping classifications, planned movements in the carrier's transportation and logistics network, planned times, and/or the like for various shipments/items 103. For example, the length, width, height, base, radius, and weight can be received as input information/data from a user and/or can be determined or collected by various types of carrier equipment. For example, sensors or cameras may be positioned to capture and/or determine the length, width, height, and weight (including dimensional weight) of a shipment/item 103 as it moves along a conveyor, moves in or out of a loading bay, is transported by a lift truck, is transported through the carrier's transportation and logistics network, and/or the like. In one embodiment, with such information/data received or captured, the central computing entity 100 can determine/identify the cube/volume for each shipment/item 103. The units of measurement for the equations may be established so that the size produced by the determinations is in cubic feet, cubic inches, or any other volumetric measure.

In various embodiments, the planned movements in the carrier's transportation and logistics network may be indicative of a predefined path between the shipment/item's origin (e.g., where the shipment/item was retrieved from the shipper) and the shipment/item's intended destination (e.g., where the shipment/item 103 is delivered to a recipient). The predefined path may be determined based on existing, known legs between various locations within the carrier's transportation and logistics network. For example, the carrier's transportation and shipping network may comprise legs between various sort locations, and accordingly, the predefined route may be defined as a plurality of legs between sort locations located between the shipment/item's origin and the shipment/item's destination. As a non-limiting example, a shipment/item originating at a shipper's home in Los Angeles, Calif. and destined for a recipient's home in Atlanta, Ga. may have a predefined route comprising a first leg between the shipper's home and a local sort location, a second leg between the local sort location in Los Angeles, Calif. and a regional sort hub for Southern California, a third leg between the regional sort hub for Southern California and a regional sort hub for the southeastern United States, a fourth leg between the regional sort hub for the southeastern United States and a local sort location in Atlanta, Ga., and a fifth leg between the local sort location in Atlanta, Ga. and the recipient's home. Accordingly, the predefined route may comprise a plurality of route legs between a plurality of predefined locations between the shipment/item's origin and the shipment/item's destination.

2. Container and/or Shipment/Item Tracking

In one embodiment, the item information/data may also include tracking information/data (of various "tracking events") corresponding to the location of a container and/or a shipment/item 103 in the transportation and logistics network. To determine and reflect a container's or a shipment/item's movement, a tracking identifier (e.g., 1Z5600100300083767) associated with the same may, for example, be scanned or otherwise electronically read or received at various points as the container and/or shipment/item 103 are transported through the carrier's transportation and logistics network. With a tracking identifier, the item information/data for the container and/or shipment/item 103 can be updated to reflect the latest or most-recent tracking events (e.g., tracking information/data)—e.g., associating the shipment/item 103 with the particular origin entity, destination entity, bundle/container, vehicle, employee, location, facility, and/or the like. An appropriate computing entity can update the item information/data with each tracking event to provide a history of the shipment/item's movement through the carrier's transportation and logistics network.

For example, in the context of an initial or intermediate transportation leg/segment, shipment/item 103 are often transported in containers by vehicles, such as tractor-trailer combinations. As noted, each vehicle may be assigned a vehicle ID. Thus, when a container or shipment/item 103 is transported to a location in the vehicle, the location of the container and/or shipment/item 103 may be collected and stored as or in association with the item information/data. This information/data may be received as automated input—e.g., via beacons, barcodes, GPS, or as manual input from a user. Moreover, depending on the carrier, the location information/data may be detailed or general. For instance, an appropriate computing entity may receive information/data indicating the location of the container and/or shipment/item 103. For example, the location information/data may indicate that the location of a container and/or a shipment/item 103 in a vehicle—located five linear feet from the door on the left side of the trailer. This location information/data can be stored as or in association with the item information/data as tracking information/data and used to indicate the location of the container or shipment/item within the vehicle (e.g., tractor/trailer).

In one embodiment, this type of tracking and association may be fully automated using beacons/tags/sensors associated with various shipments/items 103 and/or containers. For instance, a beacon associated with a shipment/item 103 may associate a container and/or a shipment/item 103 with a particular location using the corresponding information/data (e.g., unique container identifier) transmitted by the container/item. For instance, to do so, the beacon (or other computing entity) may transmit a tracking event signal/communication to an appropriate computing entity to initiate the process of associating the container and/or shipment/item 103 with the location. In one embodiment, an appropriate computing entity may associate the container and/or shipment/item 103 with the location upon receiving the tracking signals/communications from the beacon. The location of the container (and therefore the location of the associated shipments/items 103) can be updated continuously, regularly, periodically, upon determining the occurrence of one or more configurable triggers/events, and/or the like. Using this approach, an appropriate computing entity may generate and transmit signals/communications to the central computing entity 100 to initiate the process of updating the location of the container and/or shipment/item 103 as being the location of the corresponding beacon. The location of each shipment/item 103 can be updated and stored in a tracking database, for example, by the central computing entity 100. The location of the containers and/or shipments/items 103 can be monitored, tracked, and updated continuously, regularly, periodically, upon determining the occurrence of one or more configurable triggers/events, and/or the like. For example, the item information/data for the shipment/item 103 can be updated to reflect the latest or most-recent tracking events (e.g., tracking information/data) for the container, item 103, facility, and/or the like. In certain embodiments, the tracking information/data may comprise information/data indicative of all locations at which the shipment/item 103 was determined to be located during transportation. That is, all of this information/data may be stored as or in association with the item information/data. As will be recognized, a variety of other approaches and techniques can be used to adapt to various needs and circumstances.

3. Weather Information/Data

As discussed herein, weather information/data may be received and/or determined for various locations along a predefined route for a shipment/item 103 in real-time. In various embodiments, the weather information/data may be generated by one or more weather stations, which may provide (e.g., transmit) the weather information/data to a central computing entity 100. The weather information/data may be compiled into a weather database storing weather information/data for a plurality of locations. For example, the weather database may comprise weather information/data for a plurality of carrier-operated facility locations (e.g., sort locations). In various embodiments, the weather information/data may be received in real-time and/or near real-time from the one or more weather stations. Accordingly, the weather information/data may be received continuously, periodically, and/or the like from the one or more weather stations, such that the central computing entity 100 maintains current and/or near current weather information/data for a plurality of locations.

In certain embodiments, the weather information/data may be received from a third party computing entity. The weather information/data may be received from the third party computing entity in various batches, wherein each batch comprises weather information/data for a plurality of locations. For example, each batch of weather information/data may comprise weather information/data corresponding to a plurality of carrier specified locations (e.g., locations of one or more carrier operated facilities). The central computing entity 100 may be configured to store the received weather information/data in a weather database that may be utilized to identify relevant weather information/data for a predefined route.

However, in various embodiments, the central computing entity 100 may be configured to request weather information/data corresponding to particular locations, for example, from one or more weather stations and/or a third party computing entity. Accordingly, the central computing entity 100 may be configured to build a weather inquiry to be utilized to query one or more weather stations and/or a third party computing entity to retrieve weather information/data corresponding to specified locations. For example, the central computing entity 100 may be configured to build an inquiry to request specific weather information/data to be provided by a third party computing entity, for example, via an application program interface (API). As will be discussed in greater detail herein, the central computing entity 100 may be configured to automatically build the inquiry based on information/data defining a predefined route, such that the received weather information/data is indicative of weather along the defined route.

4. Defining a Route

As discussed herein, predefined routes may be defined for each of a variety of shipments/items 103 moving between origins and destinations. With reference to FIG. 4, various embodiments may begin by receiving item information/data for a shipment/item 103 to be shipped between an origin and a destination, as indicated at Block 401. As mentioned above, the item information/data may comprise information/data indicative of the origin location (e.g., an origin address), one or more intermediate locations, a destination location (e.g., a destination address), handling instructions, a carrier service level, and/or the like. The item information/data may be received from a customer (e.g., a shipper) providing input via a user interface device to be provided to the central computing entity 100, from a carrier representative (e.g., at a carrier location), and/or the like.

Once received, the item information/data may be stored by the central computing entity 100. In various embodiments, the item information/data may be stored in a corresponding shipment/item profile stored in a database or other storage device in association with the central computing entity 100. The shipment/item profile may be identified by a unique shipment/item identifier (e.g., an alphanumeric string) that may be utilized to identify the shipment/item and/or the shipment/item profile. The unique shipment/item identifier may be a tracking number or other reference identifier that may be utilized to access information/data corresponding to the shipment/item.

As indicated at Block 402 of FIG. 4, the central computing entity 100 may be configured to define a route for the shipment/item 103 between the origin and the destination. As mentioned above, the route may comprise one or more legs between various sort locations that collectively define a complete movement path/route for the shipment/item 103 between the origin and the destination. In various embodiments, the route, and accordingly the location of the various legs defining the route, may be determined based at least in part on the origin, the destination, the service level, and/or other characteristics applicable to the shipment/item 103. For example, the central computing entity 100 may select one or more preexisting route legs to be utilized to transport a shipment/item 103 along at least a portion of the route from the origin to the destination. The central computing entity 100 may generate an entire predefined route from a plurality of preexisting legs between the origin and the destination. However, it should be understood that, in various embodiments, the central computing entity 100 may create one or more route legs (e.g., a vehicle route between various locations) to be incorporated into the route from the origin to the destination. As a non-limiting example, the central computing entity 100 may determine whether any combination of preexisting route legs would satisfy an applicable carrier service level for the shipment/item 103. Upon determining that no combination of preexisting carrier service levels would satisfy the applicable carrier service level (e.g., the shipment/item 103 would arrive at the destination after an estimated arrival date), the central computing entity 100 may generate a new leg (e.g., a driving route between sort locations not previously connected by existing driving legs; a flight between airports not previously connected by existing flight legs; and/or the like).

Upon determining a route for the shipment/item, the central computing entity 100 may update the item information/data to reflect the predefined route for the shipment/item 103 as shown at Block 403 of FIG. 4. Accordingly, the item information/data may be updated to comprise information/data indicative of the various locations along the predefined route for the shipment/item 103 (e.g., the locations defining start and/or end points for various route legs).

5. Building a Weather Information/Data Inquiry

In various embodiments, the central computing entity 100 may be configured to automatically generate a weather information/data inquiry to retrieve weather information/data for a particular route and/or shipment/item 103, for example, in real-time upon receipt of information/data defining a route for the shipment/item 103. As discussed herein, such embodiments thereby enable simultaneous analysis of weather information/data relating to various locations along a defined route, each of which locations may be subject to differing weather conditions. Accordingly, various embodiments enable a comprehensive analysis of weather along an entire defined route between an origin and a destination, at least substantially simultaneously, by retrieving and compiling weather information/data relating to various locations along the route.

As discussed herein, the weather information/data inquiry may be utilized to retrieve weather information/data ultimately used to generate a weather information/data report for a route to be traversed by the shipment/item 103. Accordingly, various embodiments provide a solution to the generally manually intensive and highly inaccurate process for identifying weather likely to be encountered by the shipment/item 103 as it moves from the origin to the destination. Without such embodiments, users seeking information/data regarding weather along a transportation route would need to identify the transportation route scheduled to be travelled and then manually and individually retrieve weather information/data for each location along the route in order to obtain weather information/data for a shipment/item 103 travelling between an origin and a destination. In contrast, various embodiments automatically identify relevant weather information/data to be retrieved for a particular route, and then automatically builds an appropriate weather information/data inquiry to retrieve only relevant weather information/data for a particular route and/or shipment/item 103.

With reference again to FIG. 4, the central computing entity 100 may identify relevant locations along the generated route to generate a weather information/data inquiry as indicated at Blocks 404-405. In various embodiments, the central computing entity 100 may comprise one or more weather information/data inquiry templates stored in a memory storage area associated with the central computing entity 100. The weather information/data inquiry templates may be formatted based on a required inquiry format to be presented to a weather information/data source and/or based on a type of weather information/data requested. For example, the weather information/data inquiry templates may comprise API calls, database query code, database lookup formulas, and/or the like. For example, in embodiments in which a third party computing entity is the weather information/data source and is accessible via an API, the weather information/data inquiry template may be formatted to present a weather information/data inquiry in a format compatible with an applicable API call format. As yet another non-limiting example, in embodiments in which the weather information/data source is a plurality of distributed weather stations, the weather information/data inquiry template may be configured such that an ultimate weather information/data inquiry is only presented to relevant weather stations and/or such that only relevant weather stations provide weather information/data in response to an inquiry. As yet another non-limiting example, the weather information/data inquiry template may be configured to generate a database query for embodiments in which the weather information/data source is a database accessible via the central computing entity 100.

In various embodiments, the weather information/data inquiry template may comprise one or more portions to be automatically populated by the central computing entity 100 (e.g., in real-time) based on information/data indicative of a route. For example, the central computing entity 100 may be configured to populate various portions of a weather information/data inquiry with information/data identifying locations along a predefined route for a shipment/item 103 and/or information/data identifying expected times (e.g., days) at which the shipment/item 103 will be located at the various locations. As discussed herein, various weather information/data inquiry templates may comprise different portions configured for automatic entry by the central computing entity 100. The various weather information/data inquiry templates may thus be configured to retrieve corresponding weather information/data types. For example, a first weather information/data inquiry template may be configured to request historical weather information/data (e.g., a historical weather information/data inquiry template), a second weather information/data inquiry template may be configured to request archived weather information/data (e.g., an archived weather information/data inquiry template), and a third weather information/data inquiry template may be configured to request forecast weather information/data (e.g., a forecast weather information/data inquiry template).

a. Forecast Weather Information/Data

As discussed herein, the central computing entity 100 may be configured to generate a weather information/data inquiry to retrieve weather information/data for an expected and/or otherwise upcoming route to be traversed, for example, by one or more shipments/items 103. In such embodiments, the central computing entity 100 may be configured to generate the weather information/data inquiry to request forecast weather information/data for one or more future dates. Accordingly, the central computing entity 100 may be configured to generate the weather information/data inquiry to request weather information/data from a weather source corresponding to one or more locations along a route for a shipment/item 103 to be transported from an origin to a destination. For example, based at least in part on a predefined route for the shipment/item 103, the central computing entity 100 may be configured to build a weather information/data inquiry to retrieve forecast weather information/data corresponding to particular locations at times when the shipment/item 103 is expected to be at those locations. As a specific example, for a shipment/item 103 being transported from Los Angeles, Calif., to Atlanta, Ga., the central computing entity 100 may be configured to determine that the shipment/item 103 is scheduled to leave Los Angeles, Calif. on July 15, travel to Dallas, Tex. on July 17 and then arrive in Atlanta, Ga. on July 18 for delivery to a destination in Atlanta on July 19. Accordingly, the central computing entity 100 may generate a weather information/data inquiry to request forecast weather information/data for Los Angeles, Calif. on July 15; Dallas, Tex. on July 17; and Atlanta, Ga. on July 18-19.

In various embodiments, the central computing entity 100 may be configured to retrieve a weather information/data inquiry template to request forecast information/data from a weather information/data source. As mentioned herein, the central computing entity 100 may comprise a plurality of weather information/data inquiry templates, and accordingly the central computing entity 100 may be configured to retrieve the appropriate weather information/data inquiry template upon receipt of a request for forecast information/data for a particular shipment/item 103 and/or route.

Upon retrieval of the appropriate weather information/data inquiry template, the central computing entity 100 may be configured to populate shipment/item and/or route specific information/data for which weather information/data is requested. In various embodiments, the central computing entity 100 may be configured to query item information/data for the shipment/item 103 to retrieve information/data indicative of a route associated with the shipment/item. For example, the central computing entity 100 may be configured to retrieve information/data indicative of various locations along the route associated with the shipment/item 103, and to populate the weather information/data inquiry template with information/data indicative of the various locations along the route associated with the shipment/item 103. Moreover, in various embodiments, the central computing entity 100 may be configured to retrieve information/data indicative of various dates and/or times for which the shipment/item 103 is expected to be located at each of the various locations along the route. The central computing entity 100 may thereafter populate the weather inquiry request template with the information/data indicative of the dates and/or times at which the shipment/item 103 is expected to be located at each of the various locations along the route, to ultimately request forecast weather information/data corresponding to the particular dates and locations where the shipment/item 103 is expected to be located along the route.

In various embodiments, the weather information/data inquiry template may comprise additional information/data to request specific weather information/data for the identified locations and dates. For example, the weather information/data inquiry template may comprise information/data requesting high and low temperatures for the dates and locations identified within the weather information/data inquiry.

b. Historical and/or Archive Weather Information/Data

In various embodiments, the central computing entity 100 may be configured to build the weather information/data inquiry to retrieve historical and/or archived weather information/data for a plurality of locations. In such embodiments, the central computing entity 100 may be configured to identify one or more locations along a predefined route (e.g., an upcoming predefined route for a shipment/item 103 to be transported and/or an archived predefined route previously travelled by a shipment/item 103).

In embodiments in which the central computing entity 100 builds the weather information/data inquiry to retrieve historical data, the central computing entity 100 may populate the weather information/data inquiry template to comprise information/data indicative of various locations for which historical weather information/data is requested. In embodiments in which the central computing entity 100 builds the weather information/data inquiry to retrieve archived weather data, the central computing entity 100 may populate the weather information/data inquiry template to comprise information/data indicative of various locations for which weather information/data is requested, and to identify prior dates for which the archive weather information/data is requested.

In various embodiments, the central computing entity 100 may be configured to retrieve a weather information/data inquiry template to request historical and/or archived weather information/data from a weather information/data source. As mentioned herein, the central computing entity 100 may comprise a plurality of weather information/data inquiry templates, and accordingly the central computing entity 100 may be configured to retrieve the appropriate weather information/data inquiry template upon receipt of a request for historical and/or archived information/data for a particular shipment/item 103 and/or route.

Upon retrieval of the appropriate weather information/data inquiry template, the central computing entity 100 may be configured to populate shipment/item and/or route specific information/data for which weather information/data is requested. In various embodiments, the central computing entity 100 may be configured to query item information/data for the shipment/item 103 to retrieve information/data indicative of a route associated with the shipment/item 103. For example, the central computing entity 100 may be configured to retrieve information/data indicative of various locations along the route associated with the item, and to populate the weather information/data inquiry template with information/data indicative of the various locations along the route associated with the shipment/item 103.

Particularly for archived weather information/data inquiries, the central computing entity 100 may be configured to query the item information/data associated with the shipment/item 103 to retrieve information/data indicative of particular times at which the shipment/item was located at particular locations along the route associated with the shipment/item while the shipment/item was in transit between the origin and the destination. Ultimately, the central computing entity 100 may build an archived weather information/data inquiry to retrieve actual recorded weather information/data for the times at which the shipment/item was located at particular locations while in transit between the origin and the destination.

In various embodiments, the weather information/data inquiry template may comprise additional information/data to request specific weather information/data for the identified locations and dates. For example, the weather information/data inquiry template may comprise information/data requesting high and low temperatures for the locations identified within the weather information/data inquiry. As an additional example, the weather information/data inquiry template may comprise information/data requesting specific weather summary statistics from the weather information/data source. For example, the weather information/data inquiry template may comprise information/data requesting historical summary weather information/data (e.g., averages) for one or more repeating time periods (e.g., daily, weekly, monthly, and/or the like). As a specific example, the weather information/data inquiry template may comprise information/data requesting average monthly high and low temperatures at each identified location; average weekly high and low temperatures at each identified location; and/or the like.

6. Receiving Weather Information/Data and/or Determining Shipping Options

As illustrated at Block 406 of FIG. 4, the central computing entity 100 transmits the generated weather information/data inquiry to the weather information/data source to request the weather data. In embodiments in which the weather information/data source is a third party computing entity, the central computing entity 100 may transmit the generated weather information/data request to the third party computing entity in a format readable by the third party computing entity. As mentioned above, the central computing entity 100 may be configured to provide the generated inquiry via an API interface.

As another specific example, in embodiments in which the weather information/data source comprises a plurality of distributed weather stations, the central computing entity 100 may be configured to identify relevant weather stations and to transmit at least a portion of the generated inquiry to the identified relevant weather stations. For example, the central computing entity 100 may be configured to parse the generated weather information/data inquiry to identify locations for which weather information/data is requested, the central computing entity 100 may then be configured to query a database of weather station identifiers to identify particular weather stations associated with the identified locations in the generated weather information/data inquiry. The central computing entity 100 may then be configured to transmit individual inquiries to each identified weather station. As yet another alternative, the central computing entity 100 may be configured to transmit an inquiry having included information/data identifying relevant weather stations to a plurality of weather stations (e.g., all weather stations). The weather stations may each be configured to individually determine whether information/data is requested from the weather stations, such that only those weather stations from which information/data is requested respond and provide weather information/data to the central computing entity 100.

Upon receipt of weather information/data from the one or more weather sources (e.g., one or more weather stations) as shown at Block 407 of FIG. 4, the central computing entity 100 may be configured to retrieve shipping criteria for the one or more shipments/items 103 to determine whether any shipping options should be applied to the shipment/item 103 during transit to ensure the shipment/item 103 remains in a desired condition upon receipt at the destination, as shown at Block 408. For example, temperature sensitive shipments/items may be wrapped in a thermal blanket, may be shipped via climate controlled vehicles, and/or the like to maintain a desired temperature of the shipment/item throughout transit between an origin and a destination.

In various embodiments, the shipping criteria for a particular shipment/item 103 may be selected from one or more predefined shipping criteria (e.g., stored in association with the central computing entity 100). In certain embodiments, the shipping criteria may be configured specifically for a particular shipment/item 103. For example, the shipping criteria may be generated based at least in part on user input when the shipment is initiated, and may be stored as a portion of the item information/data. In various embodiments, the shipping criteria may define various shipping options to be applied for the shipment/item 103 based on certain weather data. As a specific example, the shipping criteria may define a particular shipping option (e.g., a thermal blanket and/or climate controlled shipping) to be applied to the shipment/item 103 when weather information/data indicates that the shipment/item 103 is scheduled to pass through and/or arrive at one or more locations in which the temperature (e.g., expected temperature, average temperature, and/or the like) satisfies an associated threshold. For example, the threshold may be a maximum temperature, a minimum temperature, a range of temperatures, and/or the like. For example, the shipping criteria may indicate that a thermal blanket should be applied to the shipment/item 103 if the temperature along the route is forecast to fall between −3-4 degrees Celsius, and that climate controlled shipping should be utilized for the shipment/item 103 if the temperature along the route is forecast to fall below −3 degrees Celsius. Accordingly, in certain embodiments, the shipping criteria may comprise a plurality of thresholds and/or the like.

In various embodiments, the central computing entity 100 may be configured to generate a weather information/data report for a particular route. The weather information/data report may comprise weather information/data for each of the identified locations along the particular route. Moreover, in various embodiments, the central computing entity 100 may be configured to generate and/or transmit a notification to a user indicative of the recommended shipping criteria for the shipment/item 103 as shown at Block 409 of FIG. 4. For example, the central computing entity 100 may be configured to generate a user interface displayed to a user (e.g., a user initiating shipment of the shipment/item 103) displaying recommended shipping criteria. As yet another example, the central computing entity 100 may be configured to transmit a notification, for example, to one or more computing entities. For example, the central computing entity 100 may be configured to transmit one or more notifications via email, SMS, and/or other communication protocols to inform one or more users of a recommended shipping criteria for the shipment/item 103.

a. Future Shipments

For weather information/data inquiries requesting weather information/data for future transportation of shipments/items 103, the central computing entity 100 may be configured to request historical (e.g., summary) weather information/data for the predefined route for the shipments/items 103 and/or forecast weather information/data for the shipments/items 103.

As discussed above, inquiries requesting historical weather information/data may comprise one or more summary parameters for which the weather information/data is requested. For example, the summary parameters may specify that the inquiry requests average monthly temperature (e.g., average high temperature and/or average low temperature), average weekly temperature, average daily temperature, and/or the like. Accordingly, the weather information/data received from the weather information/data source may comprise historical summary weather information/data for the one or more locations.

As noted above, the central computing entity 100 may be configured to retrieve shipping criteria upon receipt of the historical weather data. In such embodiments, the shipping criteria may indicate that one or more shipping options should be applied for the shipment/item 103 based on various historical and/or summary weather data. For example, shipments/items travelling through one or more areas in which the average temperature at a particular time (e.g., a particular month) satisfies one or more thresholds may be indicated as needing a particular shipping option (e.g., a thermal blanket).

Figure 5:
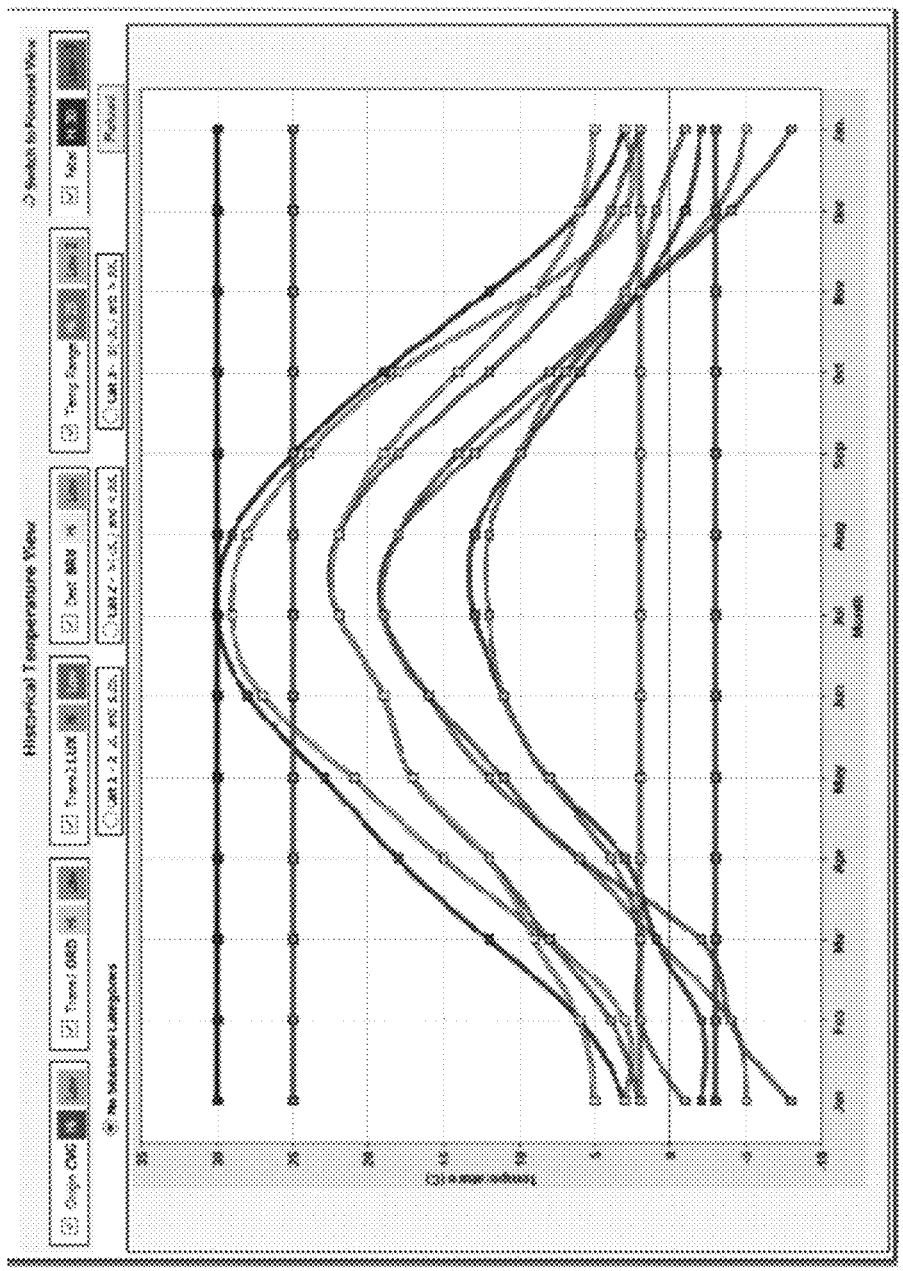
FIGS. 5-8 are example screenshots of user interfaces generated in accordance with various embodiments of the present invention.

As shown in the example screenshot shown in FIG. 5, in various embodiments, the central computing entity 100 may be configured to compile the received historical information/data for the one or more locations and/or information/data indicative of the shipping criteria and to generate an interactive graphical user interface to visually present the retrieved historical information/data to a user. In the illustrated embodiment of FIG. 5, the graphical user interface presents one or more graphical indications regarding temperature thresholds associated with the one or more shipping criteria (e.g., shown as the horizontal lines at respective constant temperatures). The graphical indications regarding temperatures thresholds thus indicate temperatures at which various shipping options are recommended. Using FIG. 5 as an example, a first shipping option (e.g., a thermal blanket) for a particular shipment/item 103 may be recommended if the shipment/item 103 is likely to pass through a location having an average temperature that drops below 2 degrees Celsius and/or above 25 degrees Celsius, and a second shipping option (e.g., climate controlled shipping) may be recommended for a particular shipment/item 103 if the shipment/item 103 is likely to pass through a location having an average temperature that drops below −3 degrees Celsius and/or above 30 degrees Celsius.

Moreover, as shown in the example screenshot of FIG. 5, the central computing entity 100 may be configured to plot summary (e.g., average monthly) high temperatures and/or low temperature for each location along a route for a particular shipment/item 103. Thus, as shown in FIG. 5, the central computing entity 100 may plot a first line illustrating average high temperatures for an origin, a second line plotting average low temperatures for an origin, and/or similar average high temperature lines and/or average low temperature lines for each location along the transportation route for the shipment/item 103 (e.g., transit locations and/or the destination location). Accordingly, the resulting graphical display illustrates whether a shipment/item 103 shipped in a particular month will travel through a location for which the average monthly temperature falls above and/or below one or more thresholds associated with various shipping options.

Moreover, in various embodiments, the graphical user interface may comprise one or more interactive features enabling a user to customize the displayed data. For example, the graphical user interface may comprise one or more radio buttons, check boxes, and/or the like configured to enable a user to display and/or hide various portions of the displayed data. For example, unchecking a displayed check box may cause the central computing entity 100 to hide information/data associated with the unchecked check box. Moreover, in various embodiments, the graphical user interface may comprise additional features to provide more detailed and/or less detailed summary data. For example, clicking on a particular month (e.g., shown at a bottom portion of the display shown in FIG. 5) may cause the central computing entity 100 to display historical average weekly and/or daily weather information/data for the selected month.

In embodiments requesting forecast weather data, the weather source may provide forecasted weather information/data for one or more requested time periods and/or a predefined time period (e.g., for the four days following the date on which the inquiry is generated and/or provided to the weather information/data source). In various embodiments, the forecasted information/data may comprise predicted high temperatures, predicted low temperatures, and/or the like, at each location on various days.

Moreover, as noted herein, the central computing entity 100 may be configured to retrieve one or more shipping criteria upon receipt of forecast weather data. In such embodiments, the shipping criteria may indicate that one or more shipping options should be applied for the shipment/item 103 based on the forecast weather data. For example, shipments/items travelling through one or more areas in which the forecast temperature satisfies one or more thresholds may be indicated as needing a particular shipping option (e.g., thermal blanket).

Figure 6:
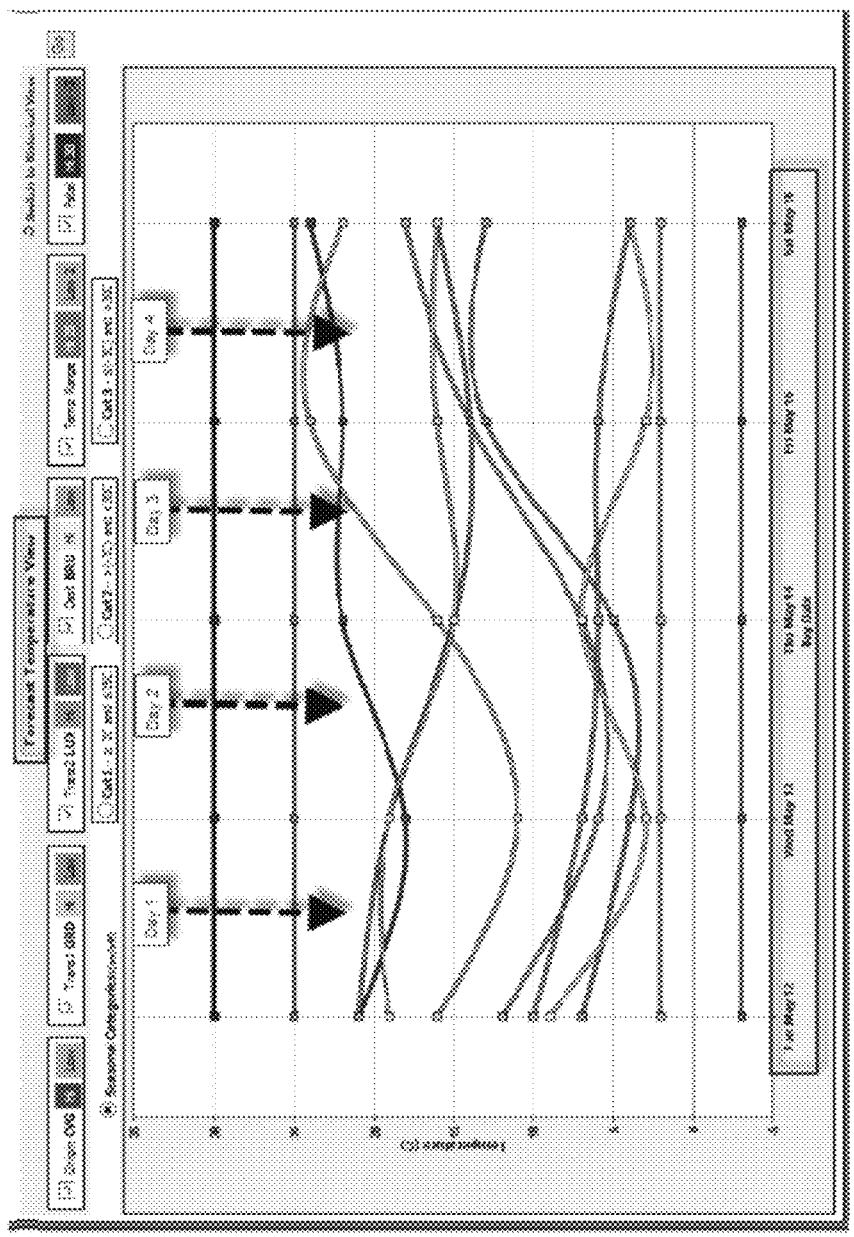

As shown in the example screenshot shown in FIG. 6, in various embodiments, the central computing entity 100 may be configured to compile the received forecast weather information/data for the one or more locations and/or information/data indicative of the shipping criteria and to generate an interactive graphical user interface to visually present the retrieved forecast weather information/data to a user. In the illustrated embodiment of FIG. 6, the graphical user interface presents one or more graphical indications regarding temperature thresholds associated with the one or more shipping criteria (e.g., shown as the horizontal lines at respective constant temperatures). The graphical indications regarding temperatures thresholds thus indicate temperatures at which various shipping options are recommended. Using FIG. 6 as an example, a first shipping option (e.g., a thermal blanket) for a particular shipment/item 103 may be recommended if the shipment/item 103 is likely to pass through a location having a forecasted temperature that drops below 2 degrees Celsius and/or above 25 degrees Celsius, and a second shipping option (e.g., climate controlled shipping) may be recommended for a particular shipment/item 103 if the shipment/item 103 is likely to pass through a location having a forecasted temperature that drops below −3 degrees Celsius and/or above 30 degrees Celsius.

Moreover, as shown in the example screenshot of FIG. 6, the central computing entity 100 may be configured to plot forecasted high temperatures and/or low temperature for each location along a route for a particular shipment/item 103. Thus, as shown in FIG. 6, the central computing entity 100 may plot a first line illustrating forecasted high temperatures for an origin for a period of time (e.g., a set period of time, such as 4 days, a period of time equal to an estimated shipping time, and/or the like), a second line plotting forecasted low temperatures for the origin for the period of time, and/or similar forecasted high temperature lines and/or forecasted low temperature lines for each location along the transportation route for the shipment/item 103 (e.g., transit locations and/or the destination location). Accordingly, the resulting graphical display illustrates whether a shipment/item 103 will travel through a location for which the forecasted temperature falls above and/or below one or more thresholds associated with various shipping options.

Moreover, in various embodiments, the graphical user interface may comprise one or more interactive features enabling a user to customize the displayed data. For example, the graphical user interface may comprise one or more radio buttons, check boxes, and/or the like configured to enable a user to display and/or hide various portions of the displayed data. For example, unchecking a displayed check box may cause the central computing entity 100 to hide information/data associated with the unchecked check box.

Moreover, in various embodiments, the graphical user interface may comprise additional features to provide more detailed and/or less detailed summary data. For example, clicking on a particular day (e.g., shown at a bottom portion of the display shown in FIG. 6) may cause the central computing entity 100 to display forecast hourly weather information/data for the selected day.

Figure 7:
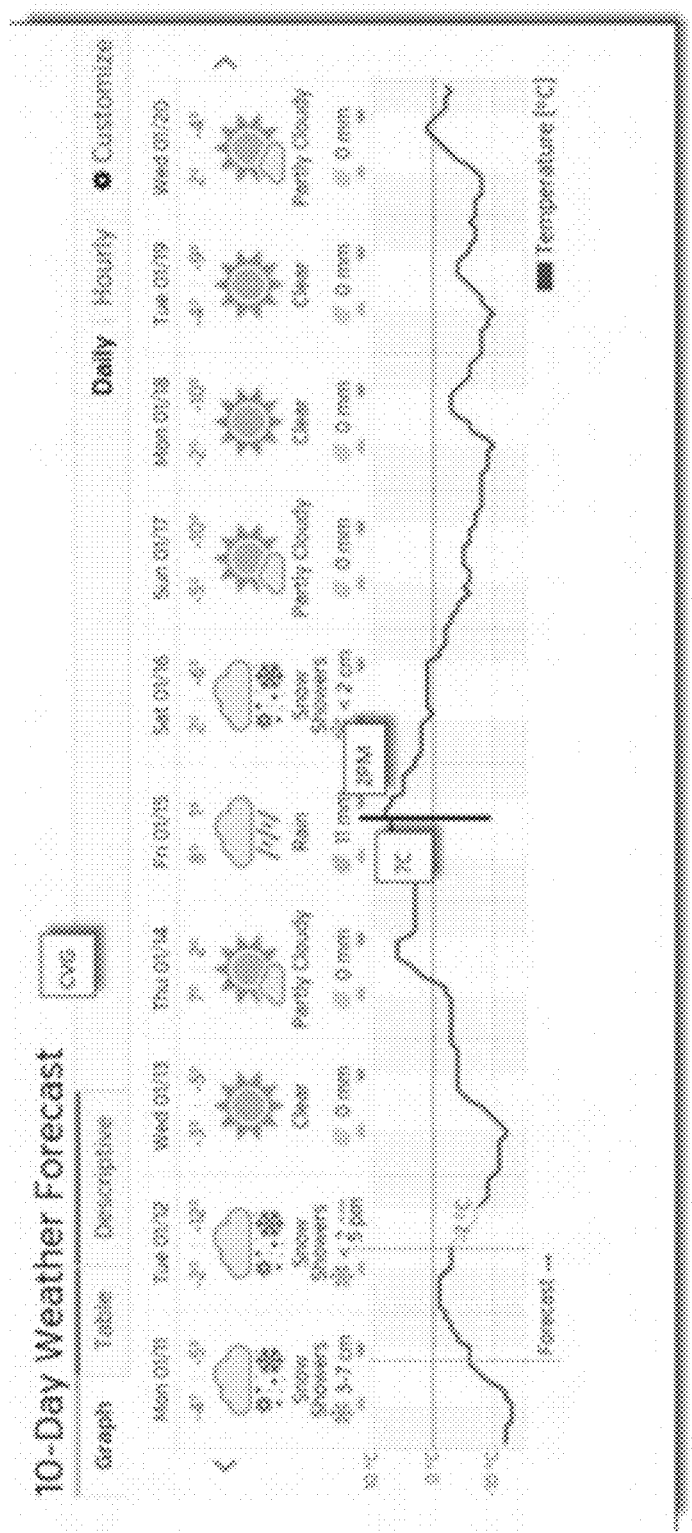

In certain embodiments, selecting a particular location (e.g., clicking on a hyperlink corresponding to a particular location) may cause the central computing entity 100 to retrieve and/or display a location-specific forecast, such as that shown in FIG. 7. As shown in FIG. 7, the detailed, location specific graphical user interface generated and displayed by the central computing entity 100 may provide temperature information/data (including forecast temperature, forecast high temperature, forecast low temperature, and/or the like), precipitation data, and/or the like. In various embodiments, the displayed information/data may provide forecast information/data for any of a plurality of time frames, such as multiple days, multiple hours, and/or the like. In various embodiments, the graphical user interface comprises one or more user-selectable hyperlinks each configured to cause the graphical user interface to modify the amount and/or type of information/data displayed. For example, as shown in FIG. 7, the graphical user interface may comprise alternatively selectable hyperlinks for changing the displayed forecast information/data between daily forecast information/data and hourly forecast data.

b. Current/Past Shipments

As discussed herein, inquiries requesting archived weather information/data may comprise information/data identifying particular locations and/or particular times for which the central computing entity 100 requests archived weather data. For example, various inquiries may request actual weather information/data for a particular location at a particular time and/or date. Accordingly, for a particular shipment/item 103, an inquiry may request archived weather information/data for the one or more locations in which the shipment/item 103 moved through during transit on the days that the shipment/item 103 was located at each of those locations. For example, for a shipment/item that left Los Angeles, Calif. on Aug. 2, 2015, was sorted at a location in Dallas, Tex. on Aug. 4, 2015, was sorted at a location in Atlanta, Ga. on Aug. 6, 2015, and was delivered in Atlanta, Ga. on Aug. 7, 2015, the generated inquiry may request weather information/data for Los Angeles, Calif. on Aug. 2, 2015, Dallas, Tex. on Aug. 4, 2015, and Atlanta, Ga. on Aug. 6-7, 2015. As will be understood, the locations for which weather information/data is requested may be indicated at any level of specificity. For example, the locations for which weather information/data is requested may be indicated as specific locations of sort locations (e.g., carrier-operated buildings).

In certain embodiments, upon retrieving the archived weather data, the central computing entity 100 may be configured to retrieve one or more shipping criteria to compare against the actual weather experienced by the shipment/item 103. For example, the shipping criteria may be stored as a portion of the item information/data, and may be indicative of acceptable weather conditions that the shipment/item 103 could be exposed to during shipment. As a specific example, the shipping criteria may specify a maximum acceptable temperature and/or a minimum acceptable temperature for the shipment/item 103. Moreover, in various embodiments, the shipping criteria may be selected for a particular shipment/item 103 (and therefore may be stored as a portion of the item information/data)

based on information/data indicative of one or more shipping options applied to the shipment/item 103. For example, a shipment/item 103 shipped without any shipping options (e.g., without a thermal blanket and/or climate controlled shipping) may be subject to a first set of acceptable weather conditions), a shipment/item 103 shipped with a first shipping option (e.g., a thermal blanket) may be subject to a second set of acceptable weather conditions, and a shipment/ item 103 shipped with a second shipping option (e.g., climate controlled shipping) may be subject to a third set of acceptable weather conditions. Accordingly, the central computing entity 100 may be configured to determine appropriate shipping criteria to be applied for a particular shipment/item 103, for example, based on determined shipping options applied for the shipment/item 103. Based at least in part on the determined shipping criteria to be applied for the shipment/item, the central computing entity 100 may be configured to determine whether the shipment/item 103 remained within acceptable weather conditions throughout transport. In various embodiments, the central computing entity 100 may be configured to compare archived weather information/data for times and locations at which the shipment/item 103 was located during shipment against the identified shipping criteria to determine whether the shipment/item 103 was subject to unacceptable weather conditions during shipment. With reference again to the above example shipment between Los Angeles, Calif. and Atlanta, Ga. between Aug. 2, 2015 and Aug. 7, 2015, the central computing entity 100 may be configured to compare weather data for each of the locations along the route against the shipping criteria to determine whether the shipment/item 103 was exposed to unacceptable weather conditions during shipment.

Figure 8:
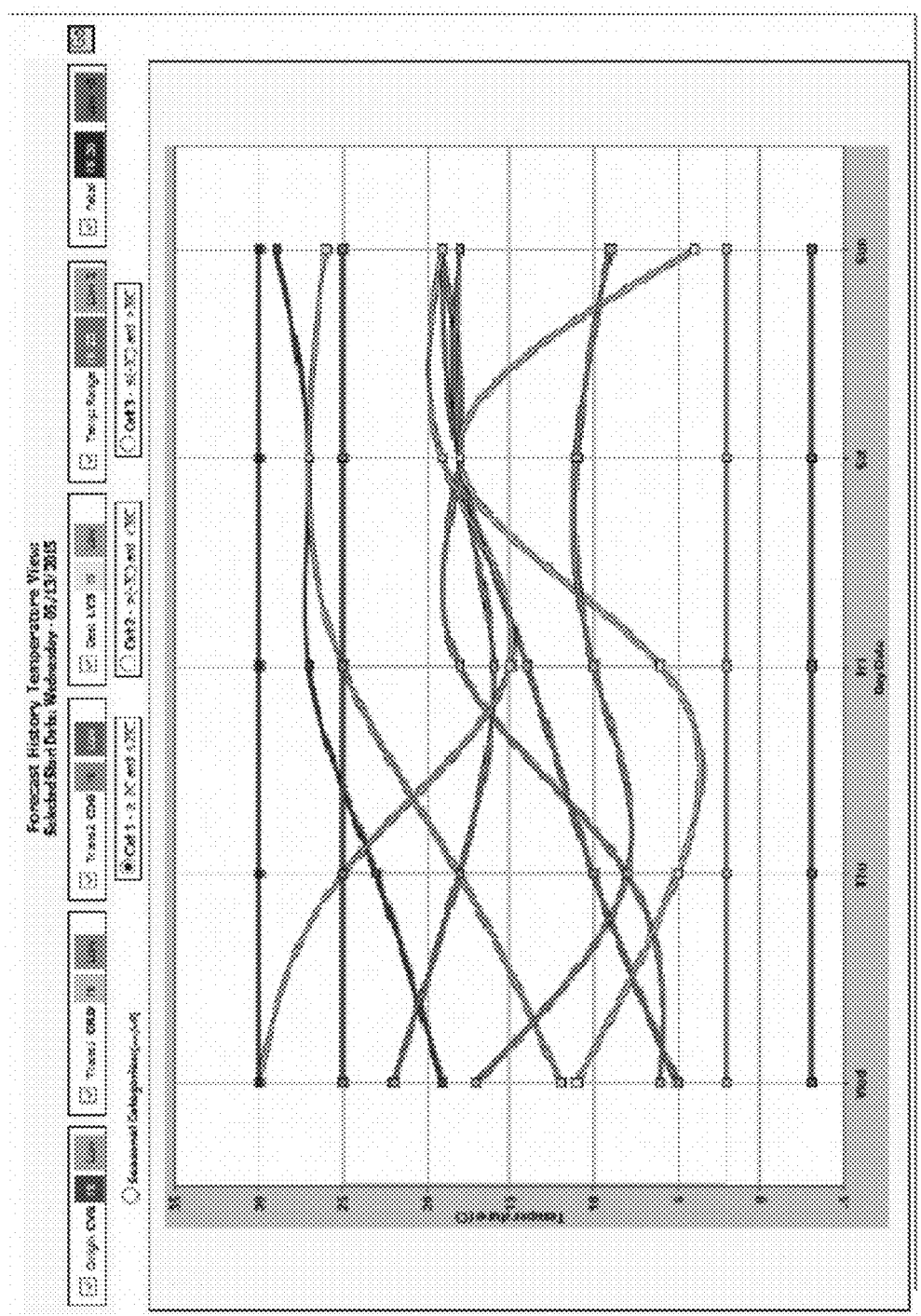

As shown in the example screenshot of FIG. 8, in various embodiments, the central computing entity 100 may be configured to compile the received archived weather information/data for the one or more locations and/or information/data indicative of the shipping criteria and to generate an interactive graphical user interface to visually present the retrieved archived weather information/data to a user. In the illustrated embodiment of FIG. 8, the graphical user interface presents one or more graphical indications regarding temperature thresholds associated with the one or more shipping criteria (e.g., shown as the horizontal lines at respective constant temperatures). The graphical indications regarding temperature thresholds thus indicate temperatures at which various shipping options are recommended. Using FIG. 8 as an example, a first shipping option (e.g., a thermal blanket) may have been recommended for a particular shipment/item 103 if the shipment/item 103 passed through a location at which the temperature that dropped below 2 degrees Celsius and/or rose above 25 degrees Celsius, and a second shipping option (e.g., climate controlled shipping) may have been recommended for the particular shipment/ item 103 if the shipment/item 103 passed through a location in which the temperature dropped below −3 degrees Celsius and/or rose above 30 degrees Celsius.

Moreover, as shown in the example screenshot of FIG. 8, the central computing entity 100 may be configured to plot archived high temperatures and/or low temperatures for each location along a route that a particular shipment/item 103 travelled on the one or more days that the shipment/item 103 was en route between an origin and a destination. Thus, as shown in FIG. 8, the central computing entity 100 may plot a first line illustrating the highest temperatures reached on various days for an origin, a second line plotting the lowest temperatures reached on the various days for the origin, and/or similar archived high temperature lines and/or archived low temperature lines for each location along the transportation route for the shipment/item 103 (e.g., transit locations and/or the destination location). Accordingly, the resulting graphical display illustrates whether a shipment/ item 103 travelled through a location for which the actual temperature fell above and/or below one or more thresholds associated with various shipping options.

Moreover, in various embodiments, the graphical user interface may comprise one or more interactive features enabling a user to customize the displayed data. For example, the graphical user interface may comprise one or more radio buttons, check boxes, and/or the like configured to enable a user to display and/or hide various portions of the displayed data. For example, unchecking a displayed check box may cause the central computing entity 100 to hide information/data associated with the unchecked check box. Moreover, in various embodiments, the graphical user interface may comprise additional features to provide more detailed and/or less detailed summary data. For example, clicking on a particular day (e.g., shown at a bottom portion of the display shown in FIG. 8) may cause the central computing entity 100 to display archived hourly weather information/data for the selected day.

In various embodiments, the graphical user interface may be configured to enable a user to select a particular location to obtain additional detailed archived weather data regarding the selected location. For example, selecting a particular location may cause the central computing entity 100 to retrieve additional archived weather data regarding the selected location, and may cause the central computing entity 100 to generate and/or display a graphical user interface similar to that shown in FIG. 7. The location-specific display may provide a display of actual weather data over a predefined historical period of time (e.g., 10 days).

Moreover, in various embodiments, the central computing entity 100 may be configured to determine whether a particular shipment/item 103 was subject to undesirable temperature and/or other weather conditions in light of information/data indicative of a shipping option actually applied to the shipment/item 103. For example, based on information/data indicative of a shipping option applied to the shipment/item 103, information/data indicative of maximum and/or minimum acceptable temperatures for the shipment/ item 103 (based at least in part on the shipping options applied to the shipment/item), and the received archived weather data, the central computing entity 100 may be configured to determine whether the shipment/item 103 was subject to undesirable temperature conditions during transit between the origin and the destination for the shipment/item. Upon determining that the shipment/item 103 was subject to undesirable temperatures, the central computing entity 100 may be configured to generate and/or transmit a notification indicating that the shipment/item was subject to undesirable temperature conditions. For example, the central computing entity 100 may generate a graphical user interface to be displayed to a user (e.g., a user seeking information/data regarding a past shipment/item 103) indicating that the shipment/item 103 was subject to undesirable temperature conditions during shipment.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A route-based weather monitoring system, the weather monitoring system comprising:
   a memory; and
   one or more computer processors collectively configured to:
   receive shipping criteria for an item, the shipping criteria including a temperature requirement for the item;
   receive route data identifying a plurality of locations along a route;
   responsive to receiving the route data, formatting an inquiry template based on one or more weather information/data sources for the plurality of locations along the route;
   populate, based at least in part on the route data, the inquiry template to generate a weather information/data inquiry to request weather information/data relating to the plurality of locations along the route;
   retrieve, from the one or more weather information/data sources, weather information/data for each of the plurality of locations by transmitting the weather information/data inquiry to the one or more weather information/data sources to cause the one or more weather information/data sources to provide weather information/data to the one or more computer processors;
   based on the weather information/data retrieved from the one or more weather information/data sources, identify expected temperatures along the route for the plurality of locations, wherein the expected temperature for each location is identified based on a time that the item is expected to be at the location; and
   based on the expected temperatures along the route and one or more temperature thresholds associated with the temperature requirement for the item, provide a shipping option for the item that maintains an item temperature within the temperature requirement for the item during shipment along the route.

2. The route-based weather monitoring system of claim 1, further comprising a distributed network of weather information/data sources each located at an associated physical location and each configured to generate weather information/data for the associated physical location, and wherein:
   each of the plurality of locations along the route are selected from physical locations having an associated weather information/data source; and
   retrieving the weather information/data comprises transmitting at least a portion of the weather information/data inquiry to a plurality of weather information/data sources each associated with a location along the route.

3. The route-based weather monitoring system of claim 1, wherein retrieving weather information/data for each of the plurality of locations comprises:
   transmitting the weather information/data inquiry via an Application Program Interface (API) to a third-party weather information/data source; and
   receiving, via the API, weather information/data for each of a plurality of locations from the third-party weather information/data source.

4. The route-based weather monitoring system of claim 1, wherein retrieving an inquiry template comprises retrieving a historical weather information/data inquiry template configured to cause one or more weather information/data sources to provide historical weather information/data to the one or more computer processors.

5. The route-based weather monitoring system of claim 4, wherein the historical weather information/data inquiry template is configured to cause one or more weather information/data sources to provide historical summary weather information/data to the one or more computer processors.

6. The route-based weather monitoring system of claim 5, wherein the historical summary weather information/data comprises a historical average temperature for a repeating time period.

7. The route-based weather monitoring system of claim 4, wherein the historical weather information/data inquiry template is configured to cause one or more weather information/data sources to provide archived weather information/data to the one or more computer processors.

8. The route-based weather monitoring system of claim 7, wherein the archived weather information/data is indicative of monitored weather conditions at a defined historical time.

9. The route-based weather monitoring system of claim 1, wherein retrieving an inquiry template comprises retrieving a forecast weather information/data inquiry template configured to cause one or more weather information/data sources to provide forecast weather information/data to the one or more computer processors.

10. A method for monitoring weather information/data along a route, the method comprising:
    receiving route data identifying a plurality of locations along a route;
    receiving shipping criteria for an item to be shipped along the route, the shipping criteria including a temperature requirement for the item;
    responsive to receiving the route data, formatting an inquiry template based on one or more weather information/data sources for the plurality of locations along the route;
    populating, based at least in part on the route data, the inquiry template to generate a weather information/data inquiry to request weather information/data relating to the plurality of locations along the route;
    retrieving, from the one or more weather information/data sources, weather information/data for each of the plurality of locations by transmitting the weather information/data inquiry to the one or more weather information/data sources to cause the one or more weather information/data sources to provide weather information/data to one or more computer processors;
    based on the weather information/data retrieved from the one or more weather information/data sources, identifying expected temperatures along the route for the plurality of locations, wherein the expected temperature for each location is identified based on a time that the item is expected to be at the location; and
    based on the expected temperatures along the route and one or more temperature threshold associated with the temperature requirement for the item, providing a shipping option for the item that maintains an item temperature within the temperature requirement for the item during shipment along the route.

11. The method of claim 10, wherein each of the plurality of locations along the route are selected from physical locations having an associated weather information/data source; and
    retrieving the weather information/data comprises transmitting at least a portion of the weather information/ data inquiry to a plurality of weather information/data sources each associated with a location along the route.

12. The method of claim 10, wherein retrieving weather information/data for each of the plurality of locations comprises:
   transmitting the weather information/data inquiry via an Application Program Interface (API) to a third-party weather information/data source; and
   receiving, via the API, weather information/data for each of a plurality of locations from the third-party weather information/data source.

13. The method of claim 10, wherein retrieving an inquiry template comprises retrieving a historical weather information/data inquiry template configured to cause one or more weather information/data sources to provide historical weather information/data to the one or more computer processors.

14. The method of claim 13, wherein the historical weather information/data inquiry template is configured to cause one or more weather information/data sources to provide historical summary weather information/data to the one or more computer processors.

15. The method of claim 14, wherein the historical summary weather information/data comprises a historical average temperature for a repeating time period.

16. The method of claim 13, wherein the historical weather information/data inquiry template is configured to cause one or more weather information/data sources to provide archived weather information/data to the one or more computer processors.

17. The method of claim 16, wherein the archived weather information/data is indicative of monitored weather conditions at a defined historical time.

18. The method of claim 10, wherein retrieving an inquiry template comprises retrieving a forecast weather information/data inquiry template configured to cause one or more weather information/data sources to provide forecast weather information/data to the one or more computer processors.

19. A computer-program product comprising at least one non-transitory computer-readable storage medium having computer-readable program code stored therein that, when executed by a processor, cause the processor to:
   receive route information/data identifying a plurality of locations along a route;
   receive shipping criteria for an item to be shipped along the route, the shipping criteria including a temperature requirement for the item;
   responsive to receiving the route data, format an inquiry template based on one or more weather information/data sources for the plurality of locations along the route;
   populate, based at least in part on the route data, the inquiry template to generate a weather information/data inquiry to request weather information/data relating to the plurality of locations along the route;
   retrieve, from the one or more weather information/data sources, weather information/data for each of the plurality of locations by transmitting the weather information/data inquiry to the one or more weather information/data sources to cause the one or more weather information/data sources to provide weather information/data;
   based on the weather information/data retrieved from the one or more weather information/data sources, identify expected temperatures along the route for the plurality of locations, wherein the expected temperature for each location is identified based on a time that the item is expected to be at the location; and
   based on the expected temperatures along the route and one or more temperature threshold associated with the temperature requirement for the item, provide a shipping option for the item that maintains an item temperature within the temperature requirement for the item during shipment along the route.

20. The computer-program product of claim 19, wherein the inquiry template comprises one of: API call, database query code, and database lookup formulas.

* * * * *

UNITED STATES PATENT AND TRADEMARK OFFICE
CERTIFICATE OF CORRECTION

PATENT NO. : 10,473,482 B2
APPLICATION NO. : 15/386832
DATED : November 12, 2019
INVENTOR(S) : Dimitri Zacharenko Page 1 of 1

It is certified that error appears in the above-identified patent and that said Letters Patent is hereby corrected as shown below:

In the Claims

Column 30, Line 57: Please remove "threshold" and replace with --thresholds--.
Column 32, Line 31: Please remove "threshold" and replace with --thresholds--.

Signed and Sealed this
Thirty-first Day of December, 2019

Andrei Iancu
*Director of the United States Patent and Trademark Office*